United States Patent [19]

Bruce et al.

[11] 4,154,416
[45] May 15, 1979

[54] SEARCH AND RESCUE KIT

[75] Inventors: William Bruce, St. Albert; Robert H. Sharples, Edmonton, both of Canada

[73] Assignee: Her Majesty the Queen in right of Canada, as represented by the Minister of National Defence, Ottawa, Canada

[21] Appl. No.: 841,666

[22] Filed: Oct. 12, 1977

[30] Foreign Application Priority Data

Oct. 18, 1976 [CA] Canada .................................. 263619

[51] Int. Cl.² ............................................. B64D 11/00
[52] U.S. Cl. ..................... 244/129.5; 49/70; 89/37.5 R; 89/37.5 D; 114/66; 244/118 P
[58] Field of Search ................ 244/1 R, 129.1, 129.5, 244/129.3, 129.4, 118 R, 118 P, 121; 354/65, 75, 70; 89/36 R, 36 Z, 36 K, 36 M, 36 J, 36 H, 40 C, 37.5 R; 114/66; 49/70

[56] References Cited

U.S. PATENT DOCUMENTS

| 1,820,958 | 9/1931 | Zinkowetsky | 244/140 |
| 2,115,932 | 5/1938 | Poindexter et al. | 244/140 |
| 2,358,257 | 9/1944 | Schwab | 89/36 Z |
| 3,559,928 | 2/1971 | Dohmeyer | 244/121 |
| 4,004,494 | 1/1977 | Mechulam | 89/36 L |

Primary Examiner—Galen L. Barefoot
Attorney, Agent, or Firm—Richard J. Hicks; Stanley E. Johnson

[57] ABSTRACT

An observer door unit which can be installed and removed from an aircraft doorway during flight, especially designed for use in aerial search and rescue operations. The unit, in its simplest form, consists of a portable base, which can be loaded on and off the aircraft, on which is mounted a combination door and window unit. Generally the door and window unit is pivotally mounted on the base to facilitate storage and handling on the aircraft. The base is provided with quick release locks to secure it to the floor of the aircraft and the door has locks to secure it to the doorway. A seat is generally slidably mounted on the base for the comfort of the observer.

10 Claims, 3 Drawing Figures

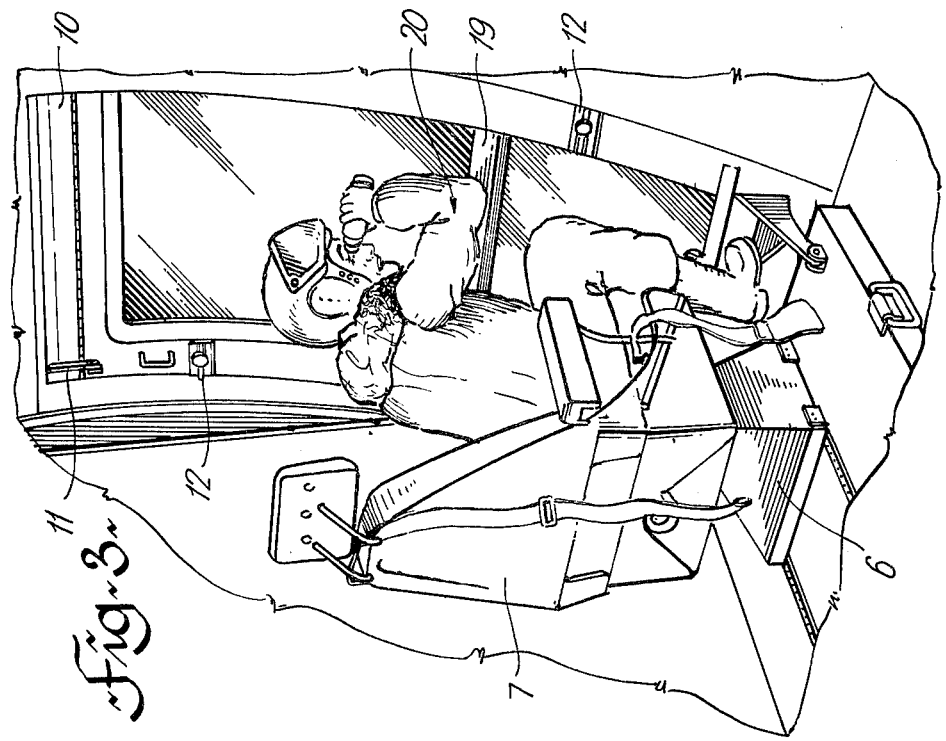
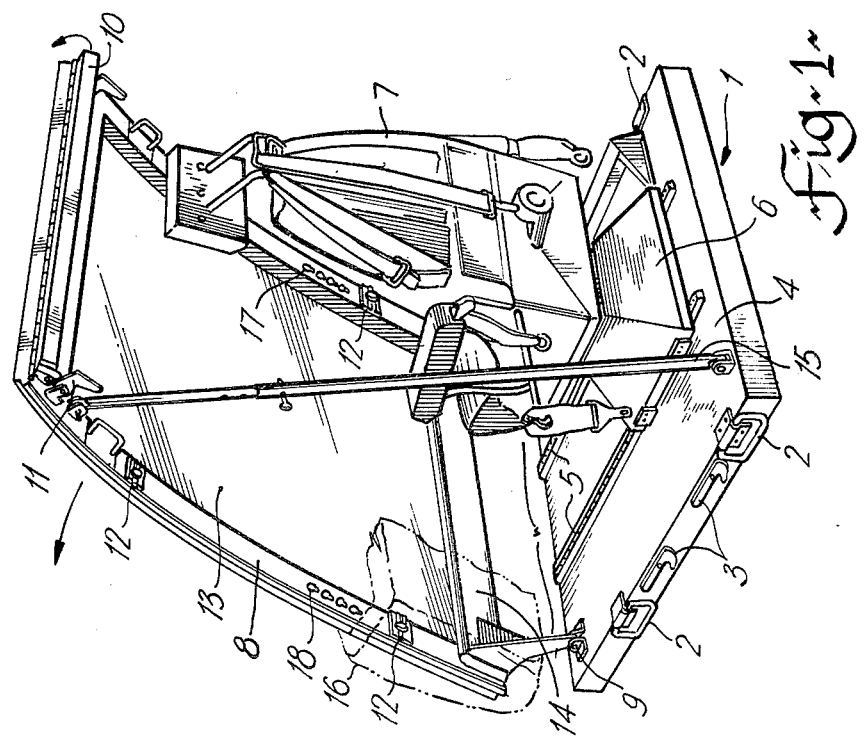

SEARCH AND RESCUE KIT

This invention relates to an observer station for installation in an aircraft.

Military, and to a lesser extent civil, aircraft are frequently called upon to undertake search missions to locate missing persons, survivors, wreckage and the like from any number of calamity situations such as air crashes, ship wrecks or loss in the wilderness, and in certain circumstances to effect rescue if possible. Certain squadrons of the Air Command of the Canadian Armed Forces are especially trained and equipped to carry out a search and rescue role. Generally such squadrons are equipped with C130 Hercules aircraft which are particularly suited to the carrying of para-rescue teams together with their specialized air-drop rescue equipment. A C130 Hercules aircraft is provided with an outwardly and downwardly opening aft ramp and an inwardly and upwardly opening aft door which facilitates loading of supplies and equipment and through which the supplies may be air-dropped. The aircraft is also provided with a door on each side, aft of the wings but forward of the aft ramp, which are primarily used as jump doors for the para teams carried by the aircraft. When carrying out a search role it has been one practise to station observers on the aft ramp, in the raised position with the upwardly opening aft door also raised. Such a practise is not only somewhat dangerous for the observer and the aircraft but also the observers' view is restricted to downward and backward. The observation position to be adopted is also extremely fatiguing to the observers. In another practise the side doorways of the aircraft have been modified to incorporate fixed Plexiglas ® bubbles, externally of the aircraft, to permit easy viewing both downwardly and sideways by the observers. Such bubbles must, however, be installed on the ground and, once in place, cannot be removed in flight thereby eliminating use of the doors for their primary personnel exit function. Para-rescue teams are forced to exit via the aft ramp which, although feasible, is hazardous to the safety of both men and plane. Because the bubbles must be installed externally and on the ground, an already air borne plane cannot be directed to a search area, thereby reducing the versatility and adaptability of the aircraft.

It is clear, therefore, that there is a need for a portable observer station which can be installed or removed in flight, so as not to impede egress from the side doors, and which provides an observer with a safe, relatively comfortable viewing station sideways and downwardly from the aircraft.

It is, therefore an object of the present invention to provide a combination observer door unit comprising a pallet, and door-window unit which is portable and which can be quickly and easily installed in or removed from an aircraft side door during flight. Preferably, a seat is also provided for the comfort of the observer.

Thus, by one aspect of this invention there is provided a door unit, for use in an aircraft for aerial search and rescue operations, comprising:
(a) a portable base; and
(b) door means, mounted on said base adjacent a marginal edge thereof, to effect closure of a doorway in said aircraft; said door means including transparent window means to provide an observer within said aircraft with a view externally thereof.

By a preferred aspect of this invention there is provided a door unit for use in an aircraft for aerial search and rescue operations comprising:
(a) a portable base;
(b) means to releasably secure said base to the floor of said aircraft;
(c) door means including transparent window means, pivotally mounted adjacent a marginal edge of said base, movable between a first position for storage and a second position for closure of a doorway in said aircraft; and
(d) seat means mounted on said portable base and slidable between a first position for storage and a second position, adjacent said marginal edge of said base, from which an observer within said aircraft obtains a view externally thereof.

The invention will be described in more detail hereinafter with reference to the accompanying drawings in which:

FIG. 1 is an isometric view of one embodiment of the observer door unit of the present invention in the storage position;

FIG. 3 is a sketch showing the unit of FIG. 1 in use as an observer station. FIG. 3 is located on the sheet containing FIG. 1.

Figure 2:
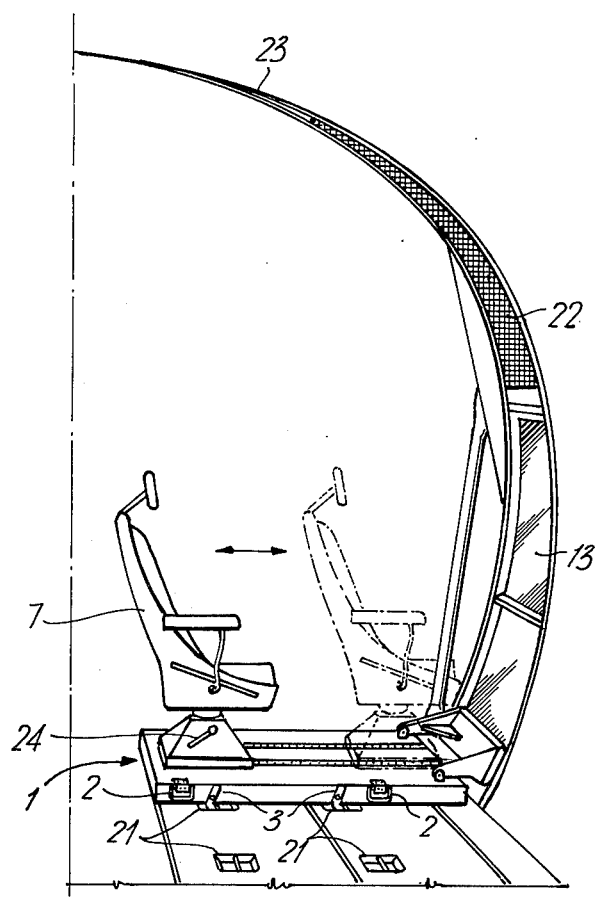
FIG. 2 is an isometric view of the unit of FIG. 1 installed in a side door opening of a C130 aircraft.

Turning firstly to FIG. 1 there is shown a rectangular pallet 1 which may be fabricated in any suitable material such as steel or an aluminum alloy. Pallet 1 is provided with lifting handles 2 to facilitate loading and unloading from the aircraft and moving the observer door unit in the aircraft, and two quick release catches 3, on each of two opposed sides of the pallet, to releasably secure the pallet to the floor of the aircraft in both its normal storage station in the aircraft away from the side door and in its operative station adjacent the side door. In a preferred embodiment the upper surface 4 of the pallet is provided with parallel tracks or runners 5 adapted to receive the base 6 of a seat 7 for sliding movement therealong and locking engagement therewith in any desired position. The seat 7, which is not an essential feature of this invention, is conveniently a standard flight engineers seat and is preferably stressed to withstand emergency landing conditions, i.e. is suitable for use as a ditching station. A door frame 8, designed to fit the side doorway of the selected aircraft is pivotally connected at 9 to the upper surface 4 of pallet 1. The frame 8 is generally provided with a hinged upper edge portion 10, to facilitate installation in the doorway in flight, and upper locking catches 11 which, in conjunction with side slide locks 12, are used to secure the frame into the doorway. The frame is provided with a window 13 of a transparent material such as Plexiglas ®, and a footrest 14. In the storage position, as shown in FIG. 1, the frame 8 is additionally supported by a removable extendible strut 15 which can be pivotally attached to pallet 1 at any convenient point, in order to minimize twisting and distortion. As will be appreciated by those skilled in the art, Plexiglas ® is a relatively soft material which is easily scratched and small scratches can cause considerable light dispersion. For maximum effectiveness therefore it is highly desirable that window 12 shall be as scratch-free as possible. In order to protect window 12 during storage and handling on the ground and in the air it is preferably covered with a padded protective cover 16, a portion only of which is shown, in phantom, in FIG. 1. Frame 8 is also provided with a series of locking slots 17 and 18 respectively on each side thereof adapted to receive and retain an arm rest bar 19 (FIG. 3) at a suitable and comfortable position for an observer 20 as shown move clearly in FIG. 3.

It will be appreciated that the observer door unit shown in FIG. 1 is not handed and may be used in either the left or right hand door of an aircraft such as a C130 as desired, thus reducing inventory and ensuring maximum utilization of equipment. Depending on the mission an aircraft may be equipped with one or two of the units and it is a simple matter to move one or both units in flight into and away from the para-doors. As will be appreciated although both rescue personnel and equipment can be dropped from the aft door, it is somewhat hazardous for para-rescue personnel to exit in this manner, it being preferred that such personnel exit via the side paratroop doors.

In practise, therefore, one or more observer door units are loaded aboard an aircraft via the aft door and stowed in any convenient location by locking the quick release catches 3 to any convenient tie-down locations in the floor of the aircraft. When required, the pallet 1, with the seat 7 in the fully retracted position shown in solid lines in FIG. 2, is moved to a position adjacent a side door, as shown in FIG. 2, and strut 15 and cover 16 are removed. Catches 3 are lockingly engaged with floor tie-downs 21. The para door 22 is then opened by sliding upwardly inside the curved roof portion of the fuselage 23. The window unit is then pivoted about pivot 9 into the door opening, upper edge 10 is pivoted into position as shown in FIG. 2 and the unit is locked into place by catches 11 and 12. The seat 7 can then be slid on tracks 5 to the forward or observation position as shown in phantom in FIG. 2. The seat 7 is releasably locked in a suitable forward position by means of conventional seat lock device shown at 24. Arm rest 14 is then placed on slots 17, 18 at a suitable height and the unit is then ready for operational use by an observer 20 as shown in FIG. 3. When the para doors are required for their conventional use to exit para-rescue personnel, for example following a successful locating mission, the observer door unit can be quickly and easily removed from the doorway. The seat 7 is slid to the retracted position and the arm rest 19 is removed. The quick release catches 3, 11 and 12 are released and the entire unit can then be moved away from the open doorway. The strut 15 and cover 16 can be replaced as time permits. The entire unit is preferably designed to weigh in the region of 180 pounds so that man handling the unit in the aircraft is not unduly difficult.

Use of the portable unit described hereinabove places only one restriction on the operation of the aircraft, namely that the aircraft cannot be pressurized during installation or during use of the unit. As most search and rescue missions are conducted at relatively low altitudes, this does not impose too serious a limitation. For obvious safety reasons it is advisable to instal a special warning light in the pilot's main instrument panel to indicate when the observer door unit is in place.

Although this invention has been described hereinabove with reference to a particular embodiment, it will be appreciated that many modifications thereto may be made without departing from the scope of this invention which is defined only by reference to the appended claims.

We claim:

1. A removable closure for use in place of an existing door in an existing door opening through the fuselage of an aircraft; said removable closure comprising:
    (a) a door frame having a peripheral outline configuration matingly corresponding to the peripheral outline of said door opening and surrounding a window for viewing therethrough by an observer during aerial search and rescue operations;
    (b) said door frame being mounted directly on a portable platform and said portable platform projecting inwardly into the interior of the aircraft when said door frame is mounted in said opening to close the same, so as to provide a supporting base for the observer;
    (c) releasable lock means to securely retain said removable closure in said door opening and said closure being dimensioned so that, when said releasable lock means is released, the closure may be moved from a location adjacent said opening to another location within said aircraft.

2. A closure as claimed in claim 1 wherein said releasable lock means comprises means to releasably secure said platform to the floor of said aircraft adjacent said opening.

3. A closure as claimed in claim 2 wherein said door frame includes means to releasably secure said closure in said opening.

4. A closure as claimed in claim 1 including seat means secured to said platform.

5. A closure as claimed in claim 4 wherein said seat means is slidably mounted on said platform for movement toward and away from said door frame.

6. A closure as claimed in claim 1 wherein said platform is pivotally mounted adjacent a lower marginal edge of said door frame.

7. A closure as claimed in claim 6 wherein said door frame pivots between a first position for storage and a second position for closure of said opening.

8. A closure as claimed in claim 7 including strut means between said door frame and said platform for supporting said door frame in said first position.

9. A closure as claimed in claim 1 including cover means to envelop and protect the opposed surfaces of said window.

10. A closure as claimed in claim 5 including bar means detachably secured across said window, in a plane substantially parallel to said base, thereby providing arm rest means for said observer.

* * * * *